(12) United States Patent
Motoishi et al.

(10) Patent No.: US 9,413,209 B2
(45) Date of Patent: Aug. 9, 2016

(54) ROTATING ELECTRIC MACHINE

(71) Applicants: Naohiro Motoishi, Chiyoda-ku (JP); Masahiko Fujita, Chiyoda-ku (JP); Yoshinobu Utsumi, Chiyoda-ku (JP)

(72) Inventors: Naohiro Motoishi, Chiyoda-ku (JP); Masahiko Fujita, Chiyoda-ku (JP); Yoshinobu Utsumi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 190 days.

(21) Appl. No.: 13/763,044

(22) Filed: Feb. 8, 2013

(65) Prior Publication Data

US 2014/0070643 A1  Mar. 13, 2014

(30) Foreign Application Priority Data

Sep. 13, 2012 (JP) ................................ 2012-201387

(51) Int. Cl.
*H02K 9/22* (2006.01)
*H02K 11/04* (2016.01)

(52) U.S. Cl.
CPC ............... *H02K 9/22* (2013.01); *H02K 11/048* (2013.01); *H02K 11/225* (2016.01)

(58) Field of Classification Search
USPC ..................................... 310/71, 89, 68 B, 64
See application file for complete search history.

(56) References Cited

U.S. PATENT DOCUMENTS

| | | | |
|---|---|---|---|
| 6,707,185 B2 * | 3/2004 | Akutsu et al. .................... 310/71 |
| 7,898,126 B2 * | 3/2011 | Kato et al. ........................ 310/58 |
| 7,932,651 B2 * | 4/2011 | Fujimoto et al. ................. 310/71 |
| 8,136,623 B2 * | 3/2012 | Takashima et al. ........... 180/444 |
| 8,643,234 B2 * | 2/2014 | Shirakata et al. ................ 310/63 |
| 2006/0108884 A1 * | 5/2006 | Shiino ..................... B60T 8/267 310/89 |
| 2007/0035185 A1 * | 2/2007 | Asao et al. ....................... 310/58 |
| 2007/0035186 A1 * | 2/2007 | Asao et al. ....................... 310/58 |
| 2007/0188119 A1 * | 8/2007 | Sonoda et al. ................. 318/254 |
| 2007/0257568 A1 * | 11/2007 | Akita et al. ...................... 310/64 |
| 2009/0251030 A1 * | 10/2009 | Fujimoto et al. ............ 310/68 B |
| 2010/0133961 A1 * | 6/2010 | Shirakata et al. ........... 310/68 B |
| 2010/0301692 A1 * | 12/2010 | Shirakata et al. ................ 310/89 |
| 2011/0066332 A1 * | 3/2011 | Sonoda et al. ................... 701/42 |
| 2011/0067945 A1 * | 3/2011 | Sonoda ................ B62D 5/0406 180/444 |

FOREIGN PATENT DOCUMENTS

JP  4479821 B  6/2010

* cited by examiner

*Primary Examiner* — Naishadh Desai
(74) *Attorney, Agent, or Firm* — Sughrue Mion, PLLC (57) ABSTRACT

A rotating electric machine including: a bracket holding a rotor and a stator of a motor; a heat sink provided fixedly to the bracket on an outside of the bracket; a resolver disposed between the heat sink and the motor; a stator circuit portion and a field circuit portion disposed to the heat sink on a side opposite to the resolver; and a control board supported on an insert case attached to the heat sink and electrically connected to the stator circuit portion and the field circuit portion. A resolver input-output terminal is electrically connected to the control board by passing through an insertion hole provided to the heat sink. The rotating electric machine configured in this manner is compact and inexpensive with an excellent heat-releasing performance and a capability of reducing man-hours required for assembly and components required for connection.

7 Claims, 10 Drawing Sheets

ROTATING ELECTRIC MACHINE

BACKGROUND OF THE INVENTION

1. Field of the Invention

The present invention relates to a rotating electric machine, and more particularly, to a rotating electric machine with a built-in controller.

2. Background Art

For a rotating electric machine, for example, a rotating electric machine with a built-in controller employed for vehicle control, various ideas have been put into practice to connect a control board of a motor to a resolver as a rotation angle sensor of a rotation shaft of the motor, so that components required for connection and man-hours required for assembly can be reduced. Patent Document 1 proposes a technique as follows. That is, a resolver stator is fixed to a lead frame of a controller while a resolver input-output terminal opposes the control board. Then, one end of the resolver input-output terminal is inserted axially into a through-hole provided to a wiring pattern on the control board and soldered therein. Consequently, the resolver is electrically connected to the control board.

CITED LIST

Patent Document

Patent Document 1: Japanese Patent No. 4479821

In the rotating electric machine with a built-in controller disclosed in Patent Document 1, however, a heat-releasing means is not provided to any of the control board, a stator circuit portion, and a field circuit portion. Hence, a cooling performance is not satisfactory.

SUMMARY OF THE INVENTION

The invention therefore has an object to provide a compact and inexpensive rotating electric machine capable of enhancing a heat-releasing performance, making an assembling work of a resolver easier, and reducing components and man-hours required for connection by providing a heat sink to a rotating electric machine including a control board of a motor, a stator circuit portion, a field circuit portion, and a resolver.

A rotating electric machine according to an aspect of the invention includes: a bracket holding a rotor and a stator of a motor; a heat sink provided fixedly to the bracket on an outside of the bracket; a resolver formed of a resolver rotor disposed to a rotation shaft of the motor between the heat sink and the motor and a resolver stator surrounding the resolver rotor; a stator circuit portion and a field circuit portion disposed to the heat sink on a surface opposite to the resolver; and a control board attached to an insert case held by the heat sink on a side of the heat sink opposite to the resolver and electrically connected to the stator circuit portion and the field circuit portion. A resolver input-output terminal is electrically connected to the control board by passing through an insertion hole provided to the heat sink.

According to the configuration above, it becomes possible to provide a compact and inexpensive rotating electric machine having an excellent heat-releasing effect on a stator circuit portion, a field circuit portion, and a control board of the rotating electric machine, making an assembling work of a resolver easier in the course of assembly of the rotating electric machine, and capable of reducing man-hours required to connect components and the number of components.

The foregoing and other objects, features, aspects, and advantages of the present invention will become more apparent from the following detailed description of the present invention when taken in conjunction with the accompanying drawings.

DETAILED DESCRIPTION

First Embodiment

Figure 1:
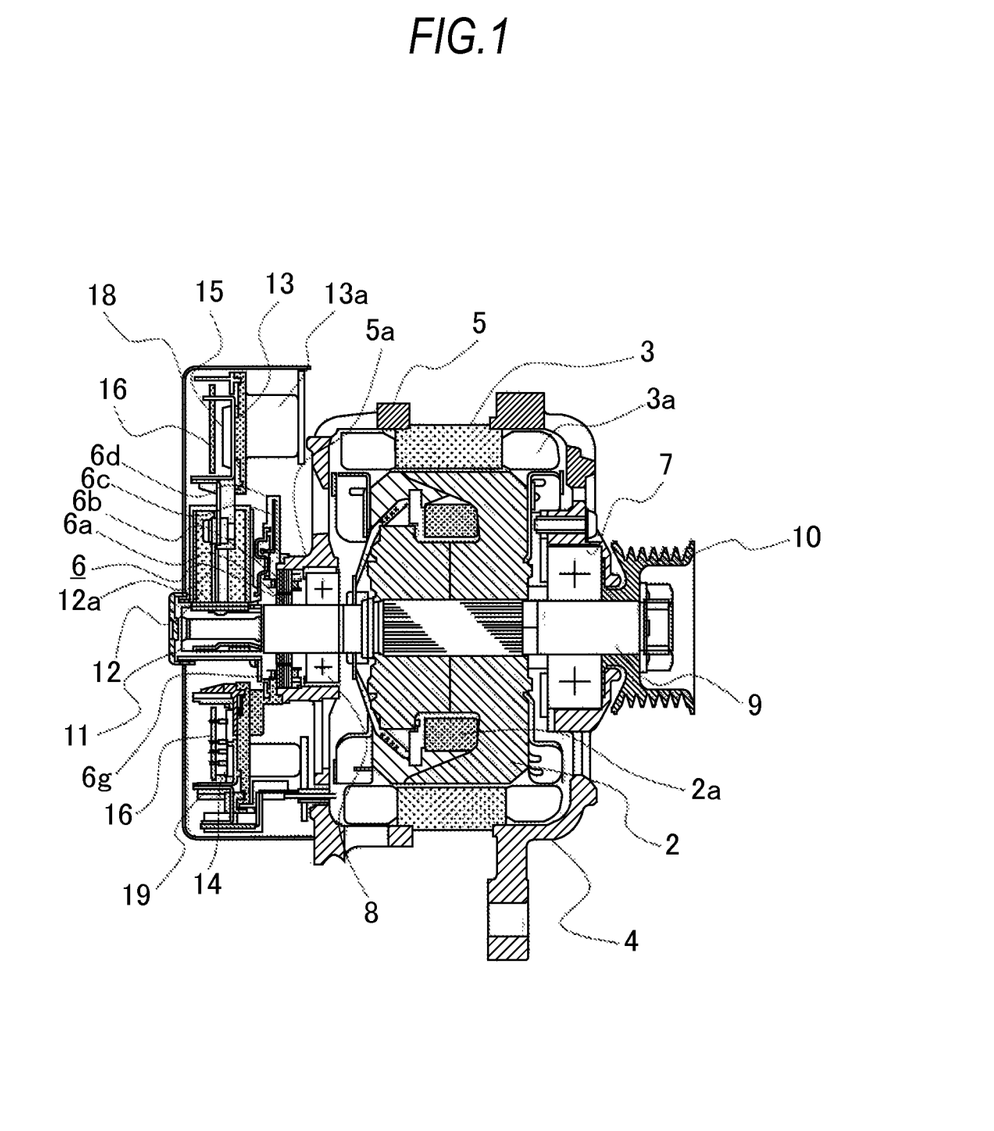
FIG. 1 is a sectional side view of a rotating electric machine according to a first embodiment of the invention.
Figure 2:
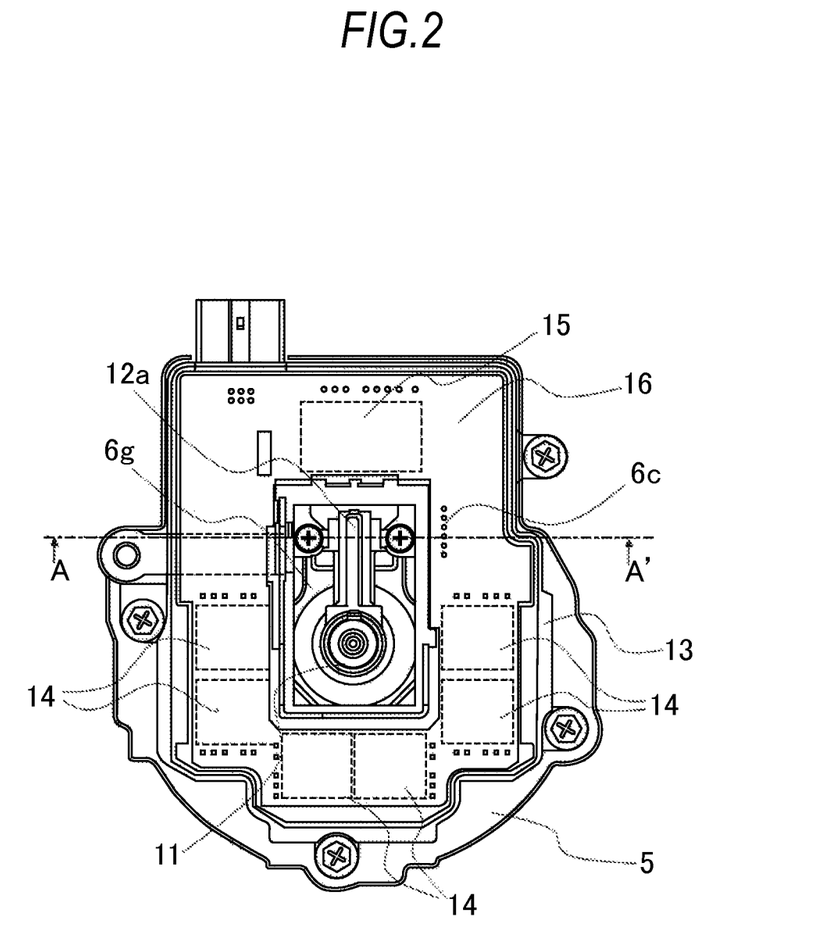
FIG. 2 is a front view of the rotating electric machine of FIG. 1 in a state where a resin cover is removed.
Figure 3:
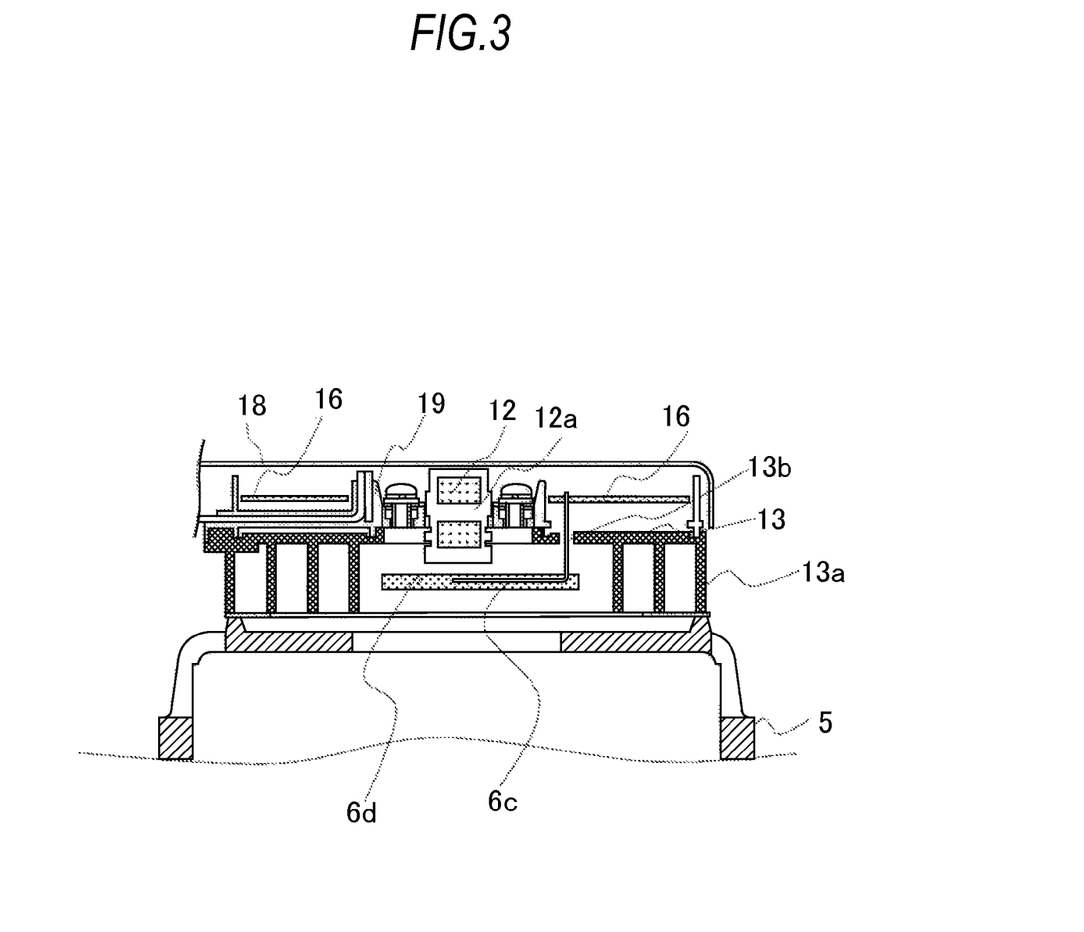
FIG. 3 is a cross section taken on the line A-A' of FIG. 2.

FIG. 1 is a cross section of a rotating electric machine with a built-in controller (hereinafter, referred to simply as the rotating electric machine) according to a first embodiment of the invention. FIG. 2 is a front view of the rotating electric machine from which a resin cover 18 is removed. FIG. 3 is a cross section taken on the line A-A' of FIG. 2.

Referring to FIGS. 1 through 3, the rotating electric machine includes a rotor 2 having a field winding 2a of a motor wound thereon and attached to a rotation shaft 9, a stator 3 having a three-phase stator winding 3a wound thereon, a front bracket 4 and a rear bracket 5 holding the rotor 2 and the stator 3, the rotation shaft 9 both ends of which are supported in a rotatable manner on the front bracket 4 and the rear bracket 5 via bearings 7 and 8, respectively, a pulley 10 fixed to a front end of the rotation shaft 9, a resolver 6 disposed at a rear end of the rotation shaft 9 and described below, a heat sink 13, and a resin cover 18 covering a control board 16 and the like.

A slip ring 11 is fit to the rear end of the rotation shaft 9 and a brush 12 coming in sliding contact with the slip ring 11 is held by a brush holder 12a. A current is supplied to the field winding 2a through the slip ring 11 and the brush 12.

A resolver stator 6b of the resolver 6 serving as a rotation angle sensor is disposed in a cylindrical sensor fixing portion 5a formed at a center of the rear bracket 5 to face outward. A resolver rotor 6a is fixed to the rotation shaft 9 in such a manner so as to oppose the resolver stator 6b. The resolver 6 is a rotation angle sensor disposed coaxially with the rotation shaft 9 and detecting a magnetic pole position of the rotation shaft 9, that is, the rotor 2.

Figure 4:
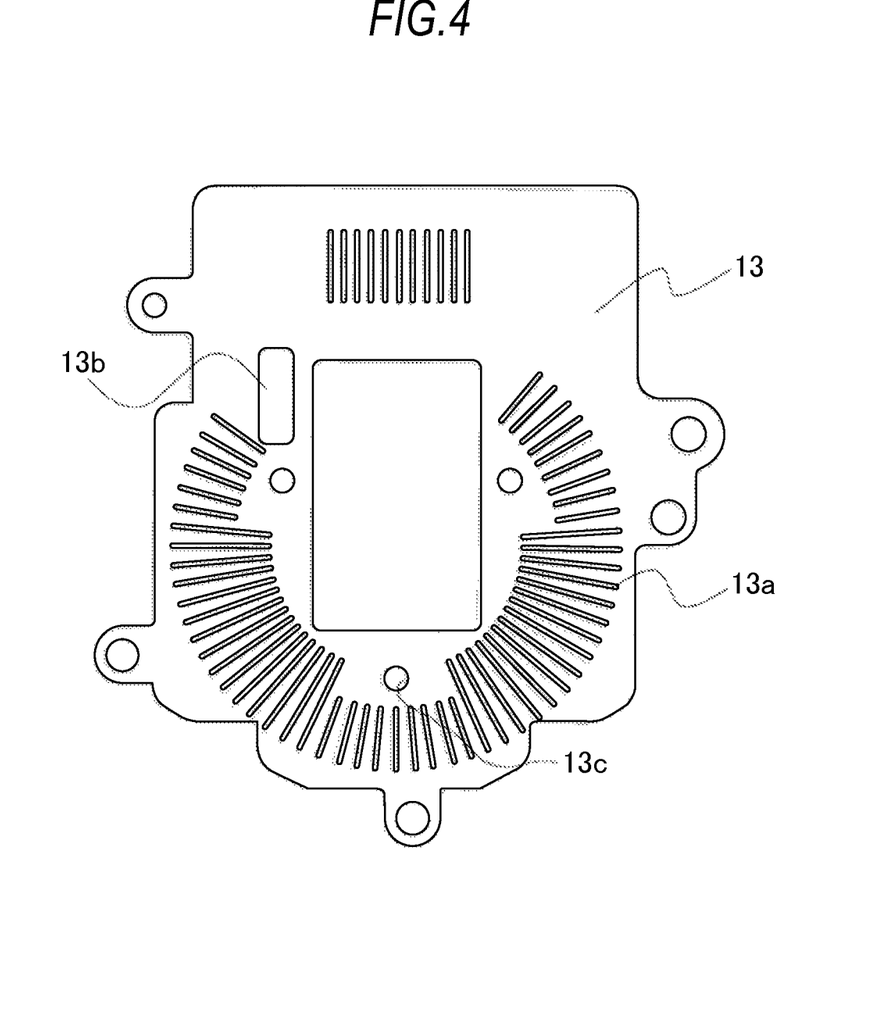
FIG. 4 is a front view of a heat sink when viewed from heat-releasing fins side.

The heat sink 13 is disposed on the outside of the rear bracket 5 and on a side of the resolver 6 opposite to the motor. The heat sink 13 is formed of a plate-like portion made of highly heat conductive metal and a large number of heat-releasing fins 13a implanted in a surface of the plate-like portion on a side of the rear bracket 5. The heat-releasing fins 13a are fixed to the rear bracket 5. As is shown in FIG. 4, the heat sink 13 is provided with an opening of a size large enough for the slip ring 11 and the brush ring 12a at a center. Also, the heat sink 13 is provided with an insertion hole 13b through which a resolver input-output terminal described below is inserted.

On a side of the heat sink 13 opposite to the motor, an insert case 19 is attached to the heat sink 13 and the control board 16 disposed oppositely to the heat sink 13 is attached to the insert case 19. A stator circuit portion 14 and a field circuit portion 15 are fixed onto the heat sink 13 opposing the control board 16, so that heat generated in each circuit portion is released by the heat sink 13.

Control of the motor and a detection of the magnetic pole position of the rotor 2 by the resolver 6 are all performed by the control board 16. Hence, a connection terminal of the stator circuit portion 14, a connection terminal of the field circuit portion 15, and a resolver input-output terminal 6c pulled out from the resolver stator 6b are all led to the control board 16 and soldered to through-holes provided to a wiring pattern on the circuit board 16. Because the stator circuit portion 14 and the field circuit portion 15 face the control board 16, the connection terminal of each circuit portion can be connected directly to the control board 16. However, because there is the heat sink 13 between the resolver 6 and the control board 16, the resolver input-output terminal 6c is inserted through the insertion hole 13b provided to the heat sink 13 and soldered to a through-hole provided to the wiring pattern on the control board 16. The insertion hole 13b is, for example, of a rectangular shape of a size large enough for the resolver input-output terminal 6c to be inserted.

The control board 16 can be connected to each of the stator circuit portion 14, the field circuit portion 15, and the resolver input-output terminal 6c at a time by inserting the respective terminals into the corresponding through-holes provided to the wiring pattern on the control board 16 and then soldering all the terminals to the through-holes simultaneously. Because the resolver input-output terminal 6c can come in close proximity to the control board 16 bypassing through the insertion hole 13b, it is also possible to connect the resolver input-output terminal 6c to the control board 16 without requiring any extra component, such as a connector.

According to the configuration of the first embodiment as described above, by providing the heat sink 13, heat of the stator circuit portion 14 and the field circuit portion 15 is released directly to the heat sink 13 and heat of the control board 16 is released from the heat sink 13 through the connection terminal and the insert case 19. It thus becomes possible to achieve a satisfactory cooling effect on the control board 16, the stator circuit portion 14, and the field circuit portion 15. Meanwhile, the connection structure as described above makes a resolver connection feasible without having to interpose a component, such as a connector. It thus becomes possible to reduce the cost and the size. In addition, the resolver input-output terminal 6c can be soldered to the control board 16 at the same time when the stator circuit portion 14 and the field circuit portion 15 are soldered to the control board 16. Accordingly, workability is enhanced and man-hours required for assembly and the number of components can be reduced.

Second Embodiment

Figure 5:
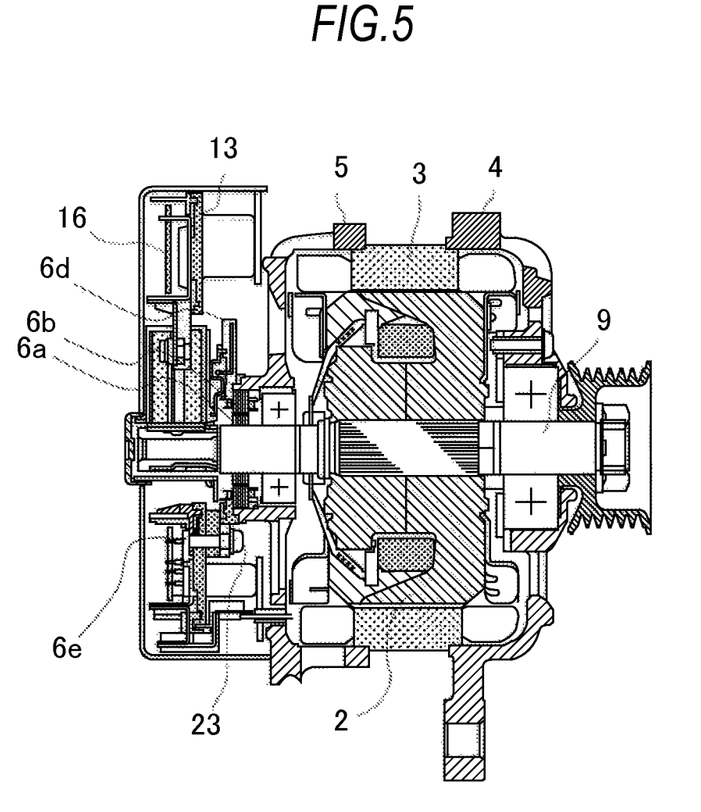
FIG. 5 is a front view of a resolver stator of a rotating electric machine according to a second embodiment of the invention.
Figure 6:
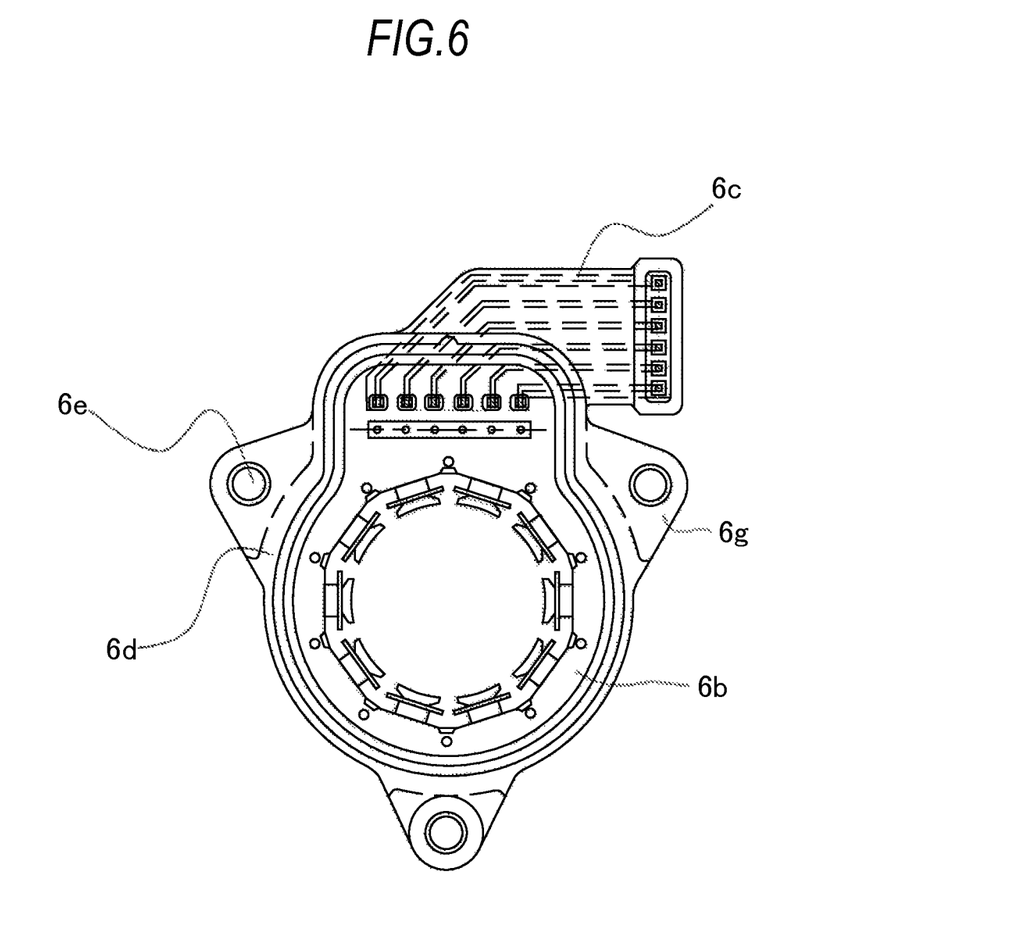
FIG. 6 is a sectional side view of the rotating electric machine according to the second embodiment of the invention.
Figure 7:
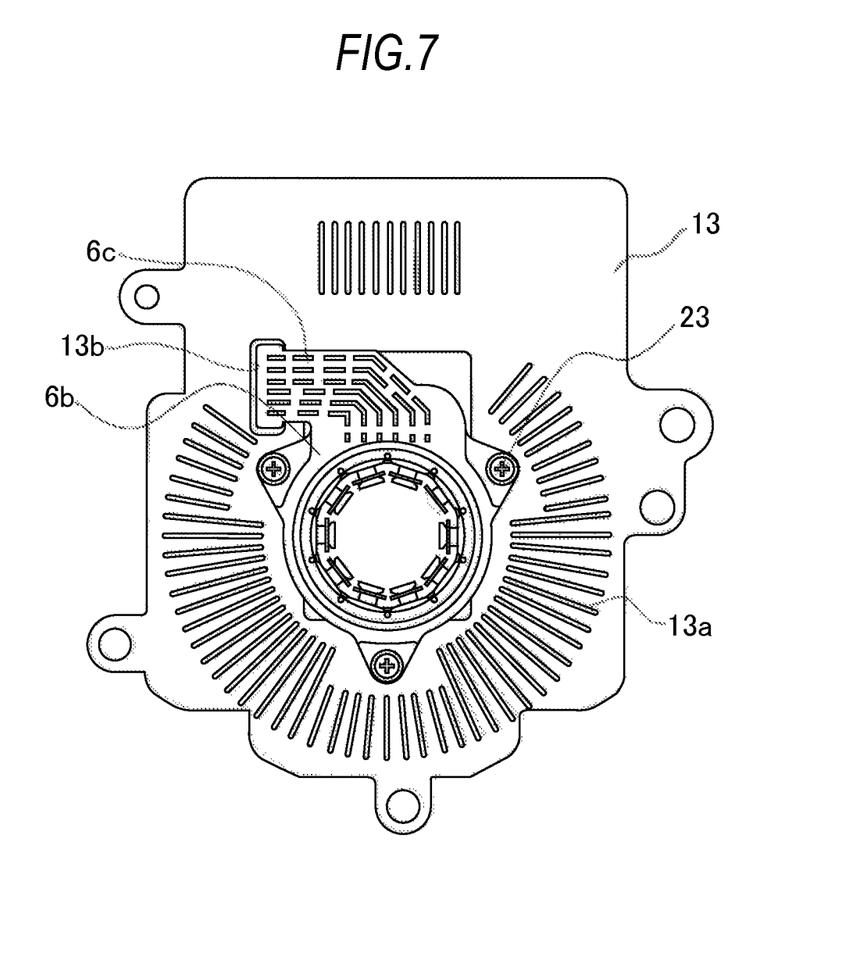
FIG. 7 is a front view showing a state where a resolver stator is attached to a heat sink.

FIGS. 5 through 7 are views used to describe a second embodiment of the invention. FIG. 5 is a sectional side view of a rotating electric machine of the second embodiment. FIG. 6 is a front view of a resolver stator of this rotating electric machine. FIG. 7 is a front view of the resolver stator when attached to a heat sink.

A resolver stator 6b of the second embodiment is provided with a holding member 6d made of an insulator that surrounds and holds the resolver stator 6b. Projected portions 6g are provided at three points on a periphery of the holding member 6d and an attachment hole 6e is provided to each projected portion 6g. On the other hand, a heat sink 13 is provided with screw holes 13c (see FIG. 4) corresponding to the respective attachment holes 6e.

The resolver stator 6b is fixed to the heat sink 13 with screws 23 using the attachment holes 6e of the holding member 6d so as to come into close contact with the heat sink 13 on a side where the heat-releasing fins 13a are provided. The resolver input-output terminal 6c is introduced from the heat-releasing fins side of the heat sink 13 to come out to the opposite side by passing through the insertion hole 13b and soldered to the through-holes of the wiring pattern on the control board 16. The rest of the configuration other than the attachment structure of the resolver stator 6b is the same as that of the first embodiment above.

It should be appreciated that the resolver stator 6b is not necessarily fixed to the heat sink 13 by screwing. For example, other fixing methods, such as bonding and thermal caulking, are also available as long as a functionally required fixing force is obtained. In the case of screwing, the attachment holes are provided at three points herein. It should be appreciated, however, that the number of the attachment holes is not particularly limited to three.

According to the rotating electric machine of the second embodiment, by preliminarily fixing the resolver stator 6b to the heat sink 13 before the rotating electric machine as a whole is assembled, it becomes possible to handle the resolver stator 6b, the heat sink 13, and the control board 16 as a single integral piece. Consequently, an assembling work of the resolver and the like becomes easier. Also, an electrical connection work by soldering the resolver input-output terminal 6c to the control board 16 is allowed before the single integral piece is attached to a motor portion. Further, because the resolver stator 6b is fixed to the heat sink 13, a cooling effect on the resolver 6 is enhanced. The other effects are the same as those obtained in the first embodiment above.

Third Embodiment

Figure 8:
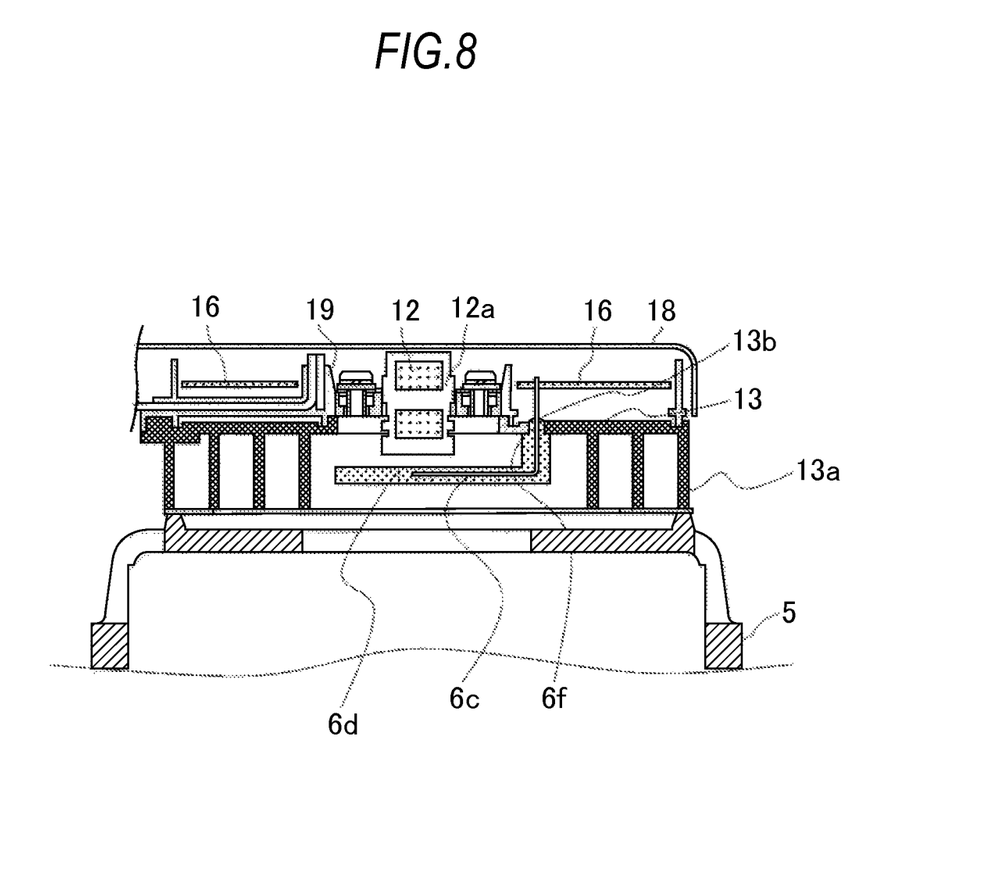
FIG. 8 is a cross section corresponding to the cross section taken on the line A-A' of FIG. 2 and showing a rotating electric machine according to a third embodiment of the invention.

FIG. 8 is a cross section showing a vicinity of a resolver of a rotating electric machine according to a third embodiment of the invention. In the third embodiment, a resolver input-output terminal holding portion 6f, which is a portion of the resolver input-output terminal 6c heading toward the control board 16, that is a portion coming out from the holding member 6d and going into the insertion hole 13b of the heat sink 13 and inserted into an insulator, is formed integrally with the holding member 6d of the resolver stator 6b, and an end of the resolver input-output terminal holding portion 6f is fit and fixed in the insertion hole 13b of the heat sink 13. The rest of the configuration is the same as those of the first or second embodiment above.

According to the third embodiment, the resolver input-output terminal 6c is held by the resolver input-output terminal holding portion 6f and the end of the resolver input-output terminal holding portion 6f is fixed in the insertion hole 13b of the heat sink 13. Hence, breaking and bending of the terminal do not occur and electrical connection to the control board 16 is further ensured. In addition, because the resolver input-output terminal holding portion 6f is formed integrally with the holding member 6d, it becomes possible to form the resolver input-output terminal holding portion 6f without increasing the number of components. The other effects are the same as those obtained in the first embodiment above.

Fourth Embodiment

Figure 9:
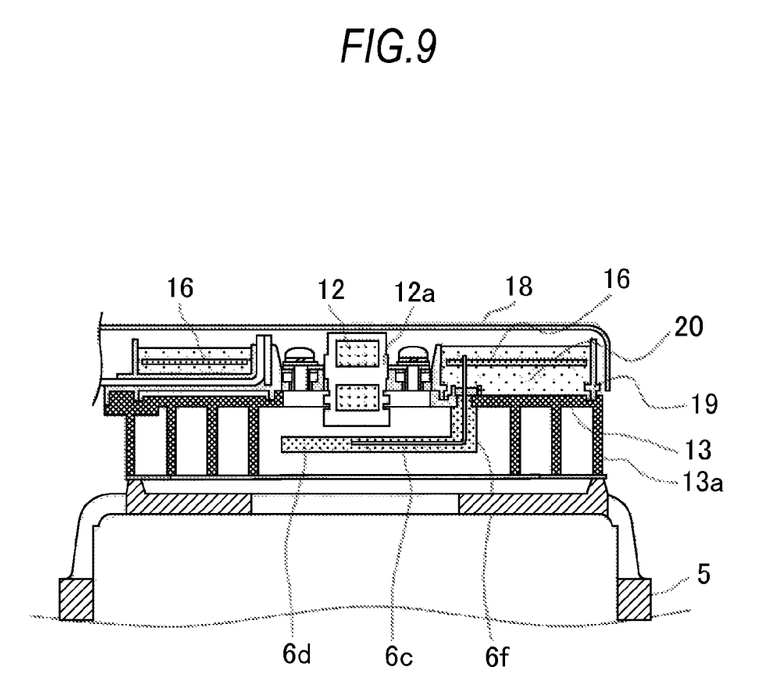
FIG. 9 is a cross section corresponding to the cross section taken on the line A-A' of FIG. 2 and showing a rotating electric machine according to a fourth embodiment of the invention.
Figure 10:
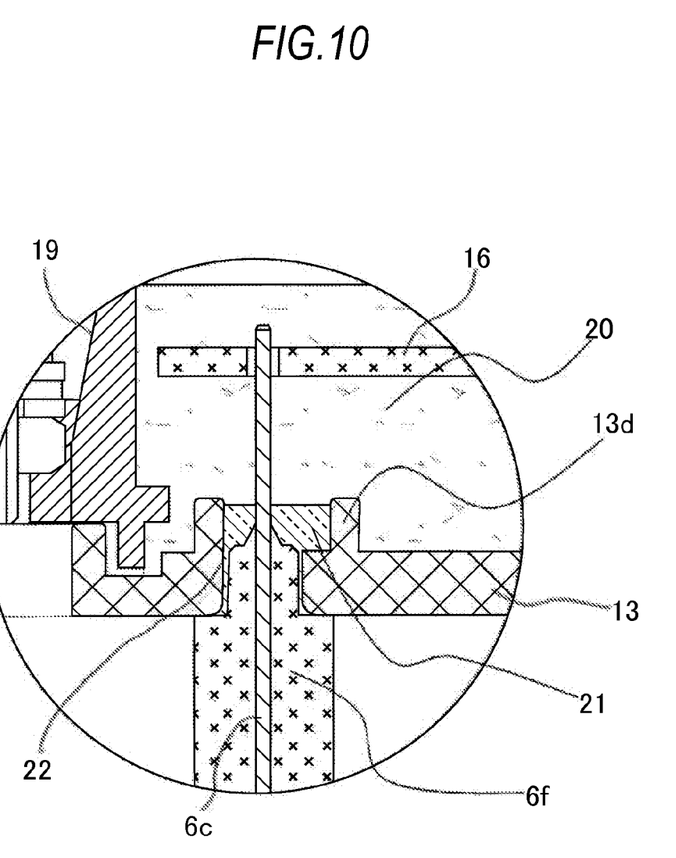
FIG. 10 is a partially enlarged view of FIG. 9.

FIG. 9 is a cross section showing a vicinity of a resolver of a rotating electric machine according to a fourth embodiment of the invention. FIG. 10 is an enlarged view of a periphery of an insertion hole of a heat sink of FIG. 9.

According to a rotating electric machine of the fourth embodiment, as is shown in FIG. 9, the control board 16 is inserted into the insert case 19 by a potting member 20, such as epoxy resin, and fixed therein. When the insert case 19 is filled with the potting member 20, a high sealing performance is required. To this end, in the fourth embodiment, a cylindrical wall 13d is provided to the insertion hole 13b of the heat sink 13 on a side of the control board 16. An inner side of the cylindrical wall 13d is used as a sealing member reservoir portion 22 to store the sealing member 21, such as highly viscous silicon resin, between the insertion hole 13b and the resolver input-output terminal holding portion 6f. It goes without saying that a clearance between the insertion hole 13b and the resolver input-output terminal holding portion 6f can merely be sealed by the sealing member 21 without providing the reservoir portion 22.

Owing to the configuration as above, it becomes possible to secure a high sealing performance at the time of potting of the control board 16 by ensuring air tightness between the insertion hole 13b of the heat sink 13 and the resolver input-output terminal holding portion 6f. By potting the control board 16, not only can the control board 16 be protected from dust and moisture, but also vibration resistance and a heat-releasing performance can be enhanced at the same time. It should be appreciated that the potting member 20 to be used is not particularly limited to epoxy resin and the sealing member 21 is not particularly limited to silicon resin, either. The other effects are the same as those in the first embodiment above.

While the invention has been described by way of the first through fourth embodiments above, various modifications and alterations of this invention will be apparent to those skilled in the art without departing from the scope and spirit of this invention, and it should be understood that this is not limited to the illustrative embodiments set forth herein.

What is claimed is:

1. A rotating electric machine, comprising:
   a bracket configured to hold a rotor and a stator of a motor;
   a heat sink provided fixedly to the bracket;
   a resolver comprising a resolver rotor located at a rotation shaft of the motor between the heat sink and the bracket, and a resolver stator surrounding the resolver rotor, which is configured to detect a magnetic pole position of the rotor;
   a stator circuit portion and a field circuit portion located at the heat sink on a surface opposite to the resolver; and
   a control board which is located at a side of the heat sink opposite to the resolver, is included within an insert case attached to the heat sink, and is electrically connected to the stator circuit portion and the field circuit portion,
   wherein a resolver input-output terminal of the resolver is electrically connected to the control board through an insertion hole provided to the heat sink.

2. The rotating electric machine according to claim 1, wherein:
   the resolver stator is fixed to the heat sink via a resolver holding member made of an insulator and holding the resolver stator.

3. The rotating electric machine according to claim 2, wherein:
   the resolver stator is fixed to the heat sink with a screw using an attachment hole provided to the resolver holding member.

4. The rotating electric machine according to claim 2, wherein:
   a resolver input-output terminal holding portion in which is inserted the resolver input-output terminal is formed integrally with the resolver holding member and a part of the resolver input-output terminal holding portion is fit into the insertion hole.

5. The rotating electric machine according to claim 4, wherein:
   a space between the insertion hole and the resolver input-output terminal holding portion is sealed using a sealing member.

6. The rotating electric machine according to claim 5, wherein:
   a sealing member reservoir portion is provided to the insertion hole on a side of the control board.

7. The rotating electric machine according to claim 1, wherein:
   the control board is inserted into the insert case attached to the heat sink using a potting member.

* * * * *